US009600643B2

(12) United States Patent
Strode

(10) Patent No.: US 9,600,643 B2
(45) Date of Patent: Mar. 21, 2017

(54) SINGLE LOGIN MULTIPLEXING

(71) Applicant: Red Hat, Inc., Raleigh, NC (US)

(72) Inventor: Maureen Emily Strode, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 129 days.

(21) Appl. No.: 14/174,616

(22) Filed: Feb. 6, 2014

(65) Prior Publication Data
US 2015/0220725 A1 Aug. 6, 2015

(51) Int. Cl.
*G06F 21/41* (2013.01)
*G06F 21/31* (2013.01)
(52) U.S. Cl.
CPC .................... *G06F 21/31* (2013.01)
(58) Field of Classification Search
CPC .......... G06F 21/31; G06F 21/41; G06F 21/34; G06F 21/604; G06F 21/00; G06F 7/04; G06F 21/6254; G11B 27/034; H04L 9/32; H04L 63/102; H04L 63/12; H04L 9/3213; H04L 9/3236; H04L 2209/42; H04N 7/00; G06Q 10/10
USPC ........ 726/2–7, 20–21, 27–29, 9; 713/1, 168, 713/183; 725/139
See application file for complete search history.

(56) References Cited

U.S. PATENT DOCUMENTS

| 7,640,336 | B1 | 12/2009 | Lu et al. | |
|---|---|---|---|---|
| 7,975,292 | B2 * | 7/2011 | Corella | 726/6 |
| 8,424,069 | B2 | 4/2013 | Weatherston | |
| 8,850,561 | B2 * | 9/2014 | Birgen et al. | 726/21 |
| 2006/0064378 | A1 | 3/2006 | Clementz et al. | |
| 2006/0218630 | A1 | 9/2006 | Pearson et al. | |
| 2007/0277220 | A1 * | 11/2007 | Shikuma et al. | 725/139 |
| 2010/0138916 | A1 * | 6/2010 | Price et al. | 726/20 |
| 2011/0078779 | A1 * | 3/2011 | Liu | G06F 21/31 726/9 |
| 2013/0111606 | A1 | 5/2013 | Gu | |
| 2013/0340053 | A1 * | 12/2013 | McCoy et al. | 726/5 |

FOREIGN PATENT DOCUMENTS

CN 102930400 2/2013

OTHER PUBLICATIONS

Jaffe, Brooke, "Netflix Will Offer Multiple User Profiles for Accounts", Jun. 12, 2013, http://www.themarysue.com/netflix-offers-multiple-profiles/.
(Continued)

*Primary Examiner* — Thanhnga B Truong
(74) *Attorney, Agent, or Firm* — Lowenstein Sandler LLP

(57) ABSTRACT

A method and system for providing access to application, where an association of a plurality of passwords with a login for an account of an application is maintained, wherein each of the plurality of passwords has a corresponding user and a corresponding set of privileges. A request for access to the account is received from a first user including the login and a first password of the plurality of password corresponding to the user, and the user is authenticated in view of the login and the password. Upon authentication of the user, access to the account is granted for the user to execute a corresponding first set of privileges.

20 Claims, 5 Drawing Sheets

(56) References Cited

OTHER PUBLICATIONS

Brice, Tom, "Allow Multiple Users to Access a Single Account", retrieved from http://community.sendgrid.com/sendgrid/topics/allow_multiple_users_to_access_a_single_account Feb. 12, 2014.

Askageek.com, "PayPal Multiple User Access", Dec. 31, 2009, http://www.askageek.com/2009/12/31/paypal-multiple-user-access/.

Smugmug.com, "Multiple Photographer Sub-Account", Oct. 7, 2001, http://feedback.smugmug.com/forums/17723-smugmug/suggestions/342479-multiple-photographer-sub-accounts.

CampaignMonitor.com, "Team Management and Collaboration Comes to Campaign Monitor", Jul. 11, 2012, http://www.campaignmonitor.com/blog/post/3765/team-management-and-collaboration-comes-to-campaign-monitor.

* cited by examiner

SINGLE LOGIN MULTIPLEXING

TECHNICAL FIELD

Embodiments of the present disclosure relate to secure access to applications on servers and systems.

BACKGROUND

Organizations, such as businesses or educational institutions, often utilize multiple users to represent the organization through accounts on on-line applications, such as social networks and content sharing services. For example, certain users could be responsible for posting content on an organization's account, while other users may be responsible for responding to comments for the organization. Access to these applications typically requires some type of access information for each user, such as a login name and a password. Actual users of these applications are typically members of these organizations, such as employees in the case of businesses or students and faculty in the case of educational institutions, that need to access these applications to carry out tasks for the organization. However, the organizations may not want to allow certain users to carry out certain tasks. Also, users could abuse their user privileges or reveal the organization's access information to non-members, which could present a security risk for the organization. Further, upon severance of the user from the organization, the organization would need to change the access information to prevent the former member from continuing to access the application, which could require additional resources and inconvenience other users.

BRIEF DESCRIPTION OF THE DRAWINGS

Various embodiments of the present disclosure will be understood more fully from the detailed description given below and from the accompanying drawings of various embodiments of the invention.

DETAILED DESCRIPTION

Figure 1:
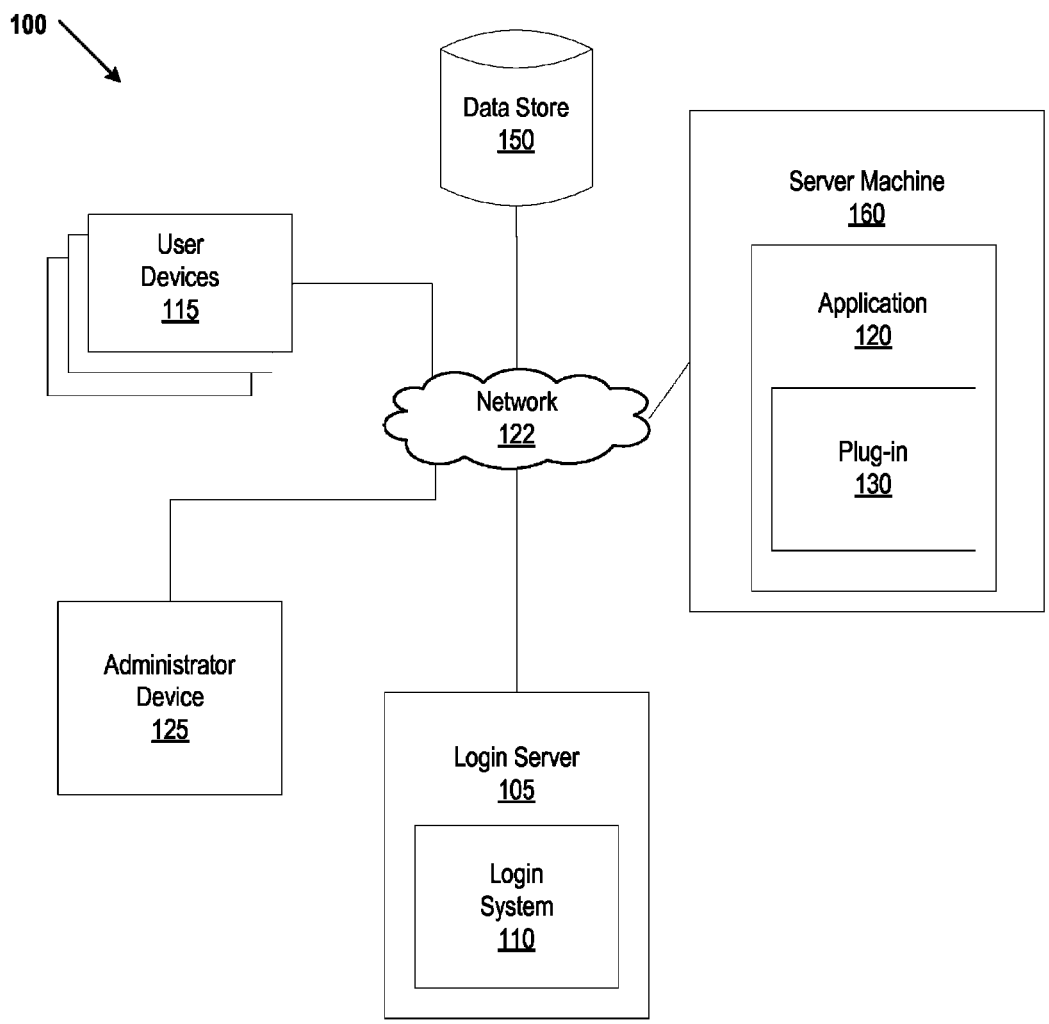
FIG. 1 illustrates exemplary system architecture, in accordance with various embodiments of the present disclosure.

Embodiments of the disclosure are directed to a method and system for single login multiplexing where an association of a plurality of passwords with a login for an account of an application is maintained, wherein each of the plurality of passwords has a corresponding user and a corresponding set of privileges. A request for access to the account is received from a user including the login and a password of the plurality of passwords corresponding to the user, and the user is authenticated in view of the login and the password. Upon authentication of the user, access to the account is granted for the user to execute a corresponding first set of privileges.

An administrator password can also be associated with the login, where the administrator password corresponds to an administrator and an administrator set of privileges. The administrator set of privileges can include associating and dissociating each of the passwords with the login. A request for access to the account can be received from the administrator including the login and the administrator password. The administrator can then be authenticated in view of the login and the first password. Upon authentication of the administrator, access to the account for the administrator to execute the set of privileges can be granted. Also, an administrator user interface that displays each of the plurality of passwords, and a corresponding user and a corresponding user status for each of the passwords can be provided.

A user interface can be provided that displays users (e.g., user IDs), a users status for each user, a set of privileges for each user, a session length for each user, and/or each user's location. According to one embodiment, messages can be sent from one user to another.

In certain situations, a group of people may need to share a single login for an application, e.g., a social network application, an online retailer account, or a content sharing service. For example, a family may share a single online retailer account. In another example, co-workers at an organization may share a single login for the organization's account on a social network application. In yet another example, a group of people organizing a conference may share a single login for a content sharing service where content, such as video from the conference, is shared.

However, since multiple users are sharing a single account, there may be difficulties in coordinating the actions of each of the users. For example, a first user could be running a recording of a presentation in one room at a conference to post on a content sharing service, and knowing whether a second user that is supposed to be recording a presentation in another room at the conference is logged in and performing the recording could be helpful to the first user. The first user could then desire to send a message to the second user through the content sharing service, for example, to inquire where and/or when the second user was planning to conduct a next recording.

In another situation, an organization could desire to limit the privileges (e.g., actions, modifications, additions, deletions, etc.) that can be executed or performed by certain users that are members of the organization with access information on a social network account of the organization. In this situation, multiple people might be sharing a login (or username) and password, e.g., for a corporate or organization social network account. However, if one of the users leaves the company or organization, the password needs to be changed (e.g., deleted or changed to a new password) so that the departing user can no longer access the social network account. Further, this new password needs to be communicated to and remembered by the remaining users. Further to this example, the organization might benefit by the different users having different sets of privileges. For example, a user that is a manager should most likely have more privileges (e.g., administrative privileges to delete users and add users, privileges to add content and delete content, etc.), while a user that is an intern would likely need to have fewer privileges (e.g., just the ability to respond to comments or reply to incoming messages).

Rather than all of the users sharing the same login and password, each of the users could have their own username and password, and an administrator could manage the users based on their user name. However, embarrassing mistakes can take place if the users confuse their personal accounts with the organization's account. For example, some social network applications provide the ability to have an organization page where individual user's personal account can be added as an administrator of the organization's page. However, many users also use their accounts to post personal content. Because the user is authenticated on their personal account and the user's account at the same time, the user could accidentally post personal content to the organization's page that the user intended to post on the user's personal page. Depending on the content accidentally posted, this type of mistake can be highly embarrassing for the organization and can potentially result in termination of the user's employment.

An embodiment provides for single login multiplexing to avoid problems such as those described above, where there is one login (or username) for the organization that is used by all users, but each user uses an individual password. In other words, there are multiple passwords, each associated with a different user, that can be used to authenticate each different user under the same login.

According to an embodiment, a dashboard enables a user to be logged into a particular online account to view other active sessions logged into the same account. For example, a user could quickly access the dashboard by clicking on a username displayed in the application. The dashboard could then drop down or the user could be linked over to a full page dashboard where the user could view a list of other currently active sessions that are associated with that login. The dashboard could also list, per session, the specific page or part of the application output that the user is currently viewing, the user's IP address, the length of the user's session, the user's approximate physical location (e.g., based on GeoIP), the user's name, the user's history of use of the application (e.g., which pages or parts of the application the user has accessed during the user's current session), etc.

In an embodiment, the name of each user associated with a specific session can be extracted through the particular password that the user entered to be authenticated for that session. For example, the user could set the user's name (i.e., actual name or selected username) to be associated with the user's password. Therefore, when the user logins in with the user's password, the user's name or ID can be determined, and, e.g., be displayed on the dashboard as a user that is currently authenticated.

The dashboard could also include a utility for users to send messages to a specific session or broadcast a message out to all sessions, according to an embodiment. Further, the messages could be received by each user through a pop-up window or a speech bubble emanating from the login area of the application.

In an embodiment, if a user is authenticated in the account with administrator privileges, then the user could have access to additional tools in the dashboard, such as the ability to end a particular user's session, delete a user's access rights, add new users, etc. In an example, an administrator can be authenticated under the login with Password A. The administrator could then execute any action available through the application, and thus has a full set of privileges. The administrator's set of privileges might also include adding and deleting users. Another user (e.g., that is not an administrator) can be authenticated under that same login, but with Password B. This user could only execute a smaller set of privileges than the administrator, such as only being able to edit content, rather than add or delete content.

In an embodiment, the administrator could create roles that specify the user types and the privileges (e.g., types of access or actions that can be performed) for that user type. The administrator could then create a password for each role and give that password to the users that should be capable of performing the privileges associated with that user type. In an embodiment, the administrator could define privileges for each individual user, create an individual password for each individual user, and associate the user with a username (e.g., a user's actual name, such as firstname lastname, or a selected username). In another embodiment, each user could still be associated with a different password, but multiple passwords could be associated with a user type.

Embodiments provide an organization with the ability to present one "face" or a united front to the public through social network applications, media applications, content sharing applications, retail sales websites, etc., that are constructed by different employees with different roles. As a result, the linking of personal accounts to the organization's account can also be avoided.

FIG. 1 shows a block diagram of a system architecture 100 according to one embodiment. In one embodiment, user devices 115 (e.g., a client devices) and an administrator device, such as personal computers, laptop computers, cellular telephones, personal digital assistants (PDAs), etc., are coupled to a login server 105 having a login system 110 that facilitates authentication of application 120 (e.g., a content sharing service, a social network application, or other application) running on a server machine 160, and a data store 150 via a network 122 (such as a public network (e.g., the Internet) or a private network (e.g., LAN)). In response to a user request to access the application 120, the login system 110 receives access information (e.g., a login and password) from the user and authenticates the user to execute a set of associated privileges via the application 120. Login server 105 may be part of server machine 160 or a separate machine. Server machine 160 and/or login server 105 may represent one or more physical computing devices such as personal computers, server computers, routers, mainframe machine, etc.

The login system 110 can be a module of the login server 105, which is able to receive requests from the user devices 115 and the administrator device 125. For example, the login system 110 can receive a request for authentication or authorization from a user. To be authorized by the login system 110 against authorization data in the data store 150 (e.g., a database or a repository in communication with or residing on a server, which can be coupled to the login server via a network 122), the request can contain a login (or username) and password, and the login system 110 determines whether the login and password are valid.

When the login system 110 receives a request, the login system 110 can use the password to identify the user in the data store 150. The data store 150 can include a list of users (e.g., authorized users) associated with the login, access information associated with each user (e.g., passwords), and, in an embodiment, sets of privileges associated with each password that determine which operations or actions the user can perform or execute on the application 120. The login system 110 determines if the user has entered a valid login/password combination and can determine the set of privileges that the user can execute. If the user has entered a valid login/password combination, then the login system 110 communicates to the application 120 that the user has been authenticated to perform the corresponding set of privileges. For example, the login system 110 can communicate to the application 120 that the user is allowed to only view or read content, only view or read a subset of content, modify all content, or modify a subset of content. The login system 110 can also create a log of the request so that the user that submitted the request can be determined at a later time.

In an embodiment, when the login system 110 grants access to the application 120, the application 120 has a plug-in 130 that receives the corresponding set of privileges, and then only allows user to perform that set of privileges on the application 120. For example, if the application 120 is a social network application and the corresponding set of privileges only includes responding to posted comments, then the plug-in 130 only allows the user to respond to posted comments.

In another embodiment, the login system 110 is an integral module of the application 120. The data store 150 can be part of the server machine 150 or login server 105 or be connected to the server machine 150 and/or login sever 105 via a network.

In one embodiment, even if only one account with one login is available for the application 120 for a given organization, a distinct password can be created and stored in the data store 150 for each user that needs to access to the application 120, where privileges can be defined for each user and associated with the user's password. When a user no longer needs access to the application 120, there need not be a login change for the organization. In this case, the user is just removed from the data store 150 by removing the password associated with the user. The remaining users can continue to use the login along with their corresponding passwords.

In an embodiment, an administrator can request authentication via the administrator device 125 or any other user device 115 by providing the login with an administrator password. When the administrator is authenticated, the administrator can execute any of the privileges available via the application 120. For example, the administrator can add a user by adding a password for that user or delete a user by the password corresponding to that user.

In an embodiment, the users have the same set of privileges, which include all of the privileges available in the application. Since the users have the same set of privileges, different sets of privileges do not need to be defined for each user. Further, because the users can execute any of the privileges available for the application, a plug-in in the application is not needed to regulate the privileges that the users can perform.

A dashboard can be provided by the login system 110 for the users of the account, in an embodiment. The dashboard provides a user interface that displays current sessions of the users. The dashboard can also display the length of the session of each user, users that have access to the account but are not currently authenticated, a history of the actions performed by each user, a portion of the application on which each user is currently working, etc. In an embodiment, the dashboard can also provide a method for users to send messages to one another, for example, by a pop-up window or a text bubble.

In an embodiment, an administrator is able to view additional features and/or capabilities on the dashboard when the administrator is authenticated via a password that is designated as an administrator password. For example, the administrator can be provided with the ability to add or delete users and their corresponding passwords via the dashboard. The administrator could also change the sets of privileges associated with each user via the dashboard or define user types that are to be associated with sets of privileges.

Figure 2:
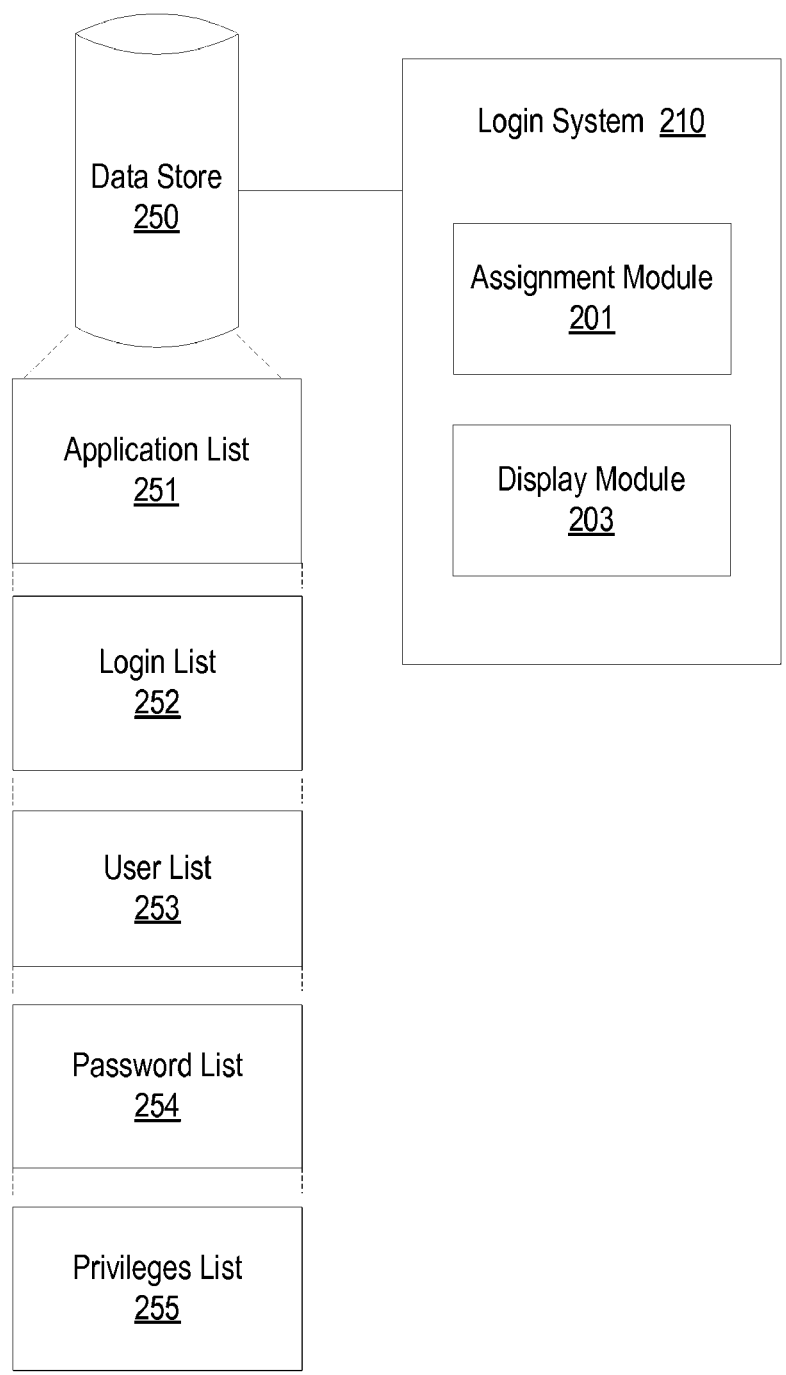
FIG. 2 illustrates a block diagram of an embodiment of a login system.

FIG. 2 illustrates a login system 210 and a data store 250 according to one embodiment. Here, the login system 210 can be the same as the login system 110 of FIG. 1, and the data store 250 can be the same as the data store 150 of FIG. 1. Login system 210 includes an assignment module 201 and a display module 203. Note that in alternative embodiments, the login system 210 may include more or less modules than those shown in FIG. 2. Also, one or more of the assignment module 201 and display module 203 may be combined into a single module. Additionally, the functionality of any of the assignment module 201 and display module 203 may be combined into a single module or may be divided between multiple modules.

According to an embodiment, an assignment module 201 can receive a request to associate a login (or username) with an application. The assignment module 201 can then store the application in an application list 251 in the data store 250 and the login in a login list 252 in the data store such that the login is associated with the application.

The assignment module 201 can also receive a request to associate a first password for a first user with the login. The assignment module 201 can then store the first user in a user list in the data store 250 and the first password in a password list 254 such that the first user and the first password are associated with the login.

According to one embodiment, the assignment module 201 can also receive a request to associate a first set of privileges with the first user. The assignment module 201 can store the first set of privileges in a privileges list 255 in the data store 250 such that the first set of privileges is associated with the first user, the first password, the login, and the application. For example, the privileges can include viewing content, modifying content, adding content, deleting content, etc.

In one example, the first user can be an administrator and the first password can be an administrator password. Further, the first set of privileges can include administrator privileges, such as adding additional users, removing current users, creating user types, modifying sets of privileges, etc.

The assignment module 201 can also receive a request to associate a second password for a second user with the login. The assignment module 201 can then store the second user in a user list in the data store 250 and the second password in a password list 254 such that the second user and the second password are associated with the login.

According to one embodiment, the assignment module 201 can also receive a request to associate a second set of privileges with the second user. The assignment module 201 can store the second set of privileges in a privileges list 255 in the data store 250 such that the second set of privileges is associated with the second user, the second password, the login, and the application. For example, the second set of privileges can include different privileges than the first set of privileges.

The assignment module 201 can similarly continue to receive additional users, corresponding passwords, and, optionally, corresponding sets of privileges, for storing in the user list 253, the password list 254, and the privileges list 254, and associate them with the login in the login list 252.

In one example, an administrator that is already authenticated in the application via an administrator password can request that additional users be added to the user list 253. Here, the administrator can define the password of the additional users and the sets of privileges for the additional users.

The display module 203 can provide a user interface dashboard that displays information stored in the data store including users, a status of each user such as whether the user has a current session and what aspect of the application that the user is viewing or modifying (e.g., where the user's identity is determined via the password the user used for authentication), a length of each user's current session, each user's set of privileges, etc. Different users may be able to view different information on the dashboard. For example, administrators may be able to view all of the information that is available, while a non-administrator user may only be able to view which users have current sessions and the aspect of the application on which each user with a current session is working.

In an embodiment, users can also send messages to each other through the dashboard. For example, a first user may be able to view that a second user has a current session. The first user could select to send a message to the second user, enter the message, and then send the message to the second user. The second user could then receive the message through the application. For example, a pop-up window could appear in the application on the display of the second user or a text bubble could appear in the application on the display of the second user.

In an example, the application can be a social network application. Here, the administrator selects a login and a password to initiate an account for a company on the social network application where the administrator has administrator privileges such that the administrator is allowed to execute the actions that are available on the social network. The administrator wants to add other users to help to manage what is displayed on the company's page on the social network, but the administrator also does not want the page to appear as though different users are contributing to what is displayed on the page. Therefore, the administrator adds additional users by adding additional passwords that are associated with the single login for the company and defines the privileges for each of the additional users to be fewer than the privileges of the administrator. For example, the administrator can add a first user that is a manager and assign that first user a first password. The administrator can then define a set of privileges for the first user, such as the ability to add new content, and associate that set of privileges with the first password. The administrator may choose to define a manager user type with an associated set of privileges, and the administrator can define passwords for multiple users that are associated with the manager user type. The administrator could add another user with a corresponding password, and define a different set of privileges for that user.

In an embodiment, a user could retrieve or recover the user's password (e.g., that was lost or forgotten) by providing the user's email address and/or a key, both of which could have been associated with the user when the user's password was defined. The user's password could then be sent to the user's email address.

Figure 3:
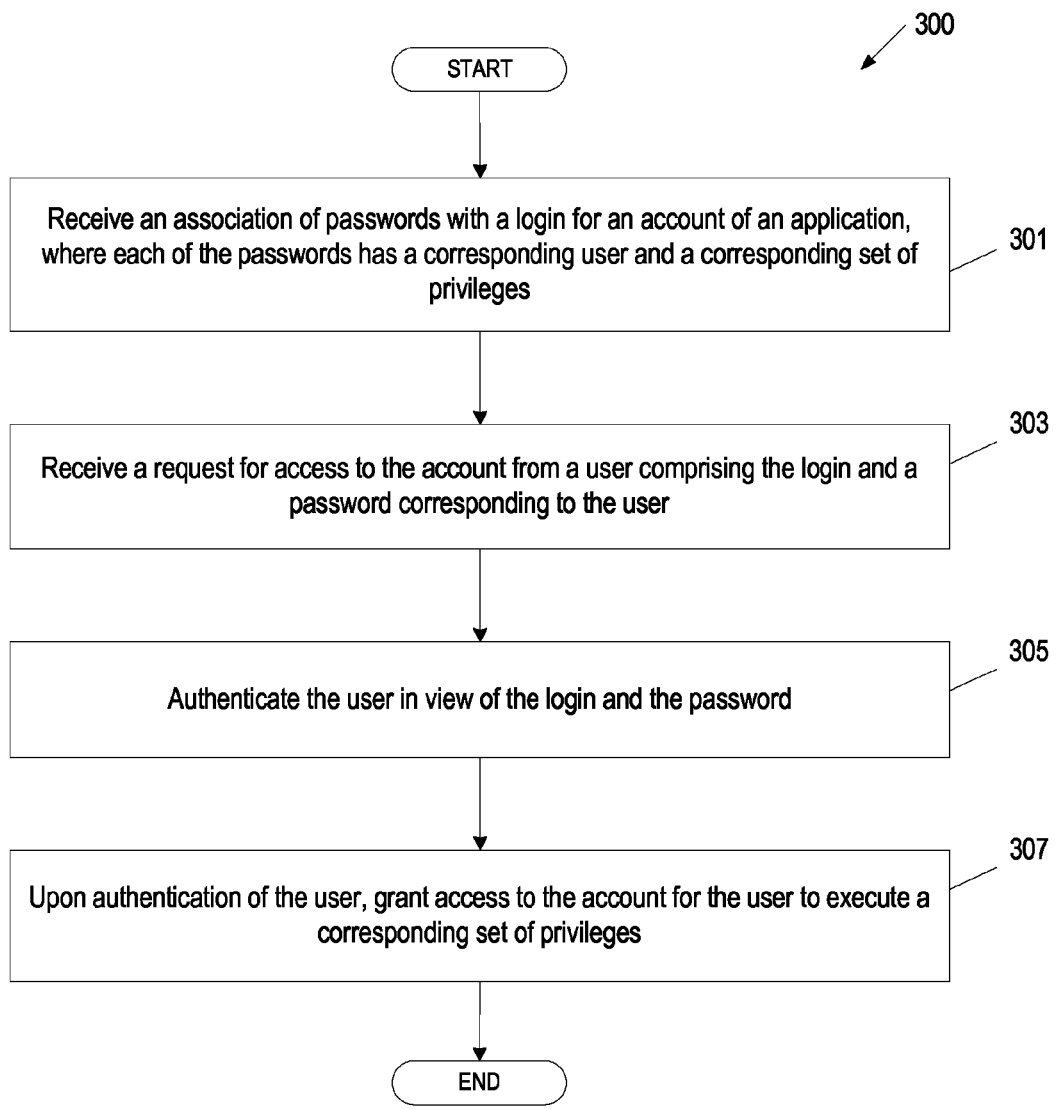
FIG. 3 illustrates a flow diagram of an embodiment of a method of single login multiplexing according to one embodiment.

FIG. 3 illustrates a method 300 of single login multiplexing according to one embodiment. The method 300 is performed by processing logic that may comprise hardware (circuitry, dedicated logic, etc.), software (such as is run on a general purpose computer system or a dedicated machine), or a combination of both. In one embodiment, the method 300 is performed by the password system 210 of FIG. 2.

At block 301, processing logic receives an association of passwords with a login for an account of an application, where each of the passwords has a corresponding user and a corresponding set of privileges. In an embodiment, the login can be associated with the application. In another embodiment, the login is received by the application.

For example, the application can be a content sharing service, and an organization desires to have an account for the organization with the content sharing service. The organization can open an account with the content sharing service, and establish that the login will be the login for the organization on the organization's account. The organization may desire to have a member of the organization perform certain actions, such as adding content, on the organization's account for the content sharing service. Thus, the organization can submit a request to associate a first password and a first set of privileges (e.g., responding to comments and adding new comments) with the organization's login for a first user. The organization may desire to have another member of the organization perform certain actions, which may be the same or different from the first user's action (e.g., including responding to comments, but not including adding new content), on the organization's account for the content sharing service. Thus, the organization can submit a request to associate a second password and a second set of privileges with the organization's login for a second user.

At block 303, processing logic receives a request for access to the application from a user, where the request includes the login and the user's corresponding password. At block 305, processing logic attempts to authenticate the first user in view of the login and the password. At block 307, upon authenticating the user in view of the login and the first password, processing logic grants access to the application for the first user to execute a corresponding set of privileges.

Further to the example above, the organization would like for the first user to add some newly generated content to the organization's account on the content sharing service. So, the first user of the organization attempts to login to the organization's account with the content sharing service using the login and the first password. Upon authentication of the first user, the first user is now able to add the newly generated content to the content sharing service.

Further to the example above, the organization would like for the second user to respond to some comments on content on the organization's account on the content sharing service. So, the second user of the organization attempts to login to the organization's account with the content sharing service using the login and the second password. Upon authentication of the second user, the second user is now able to respond to the comments on the content on the organization's account on the content sharing service.

Figure 4:
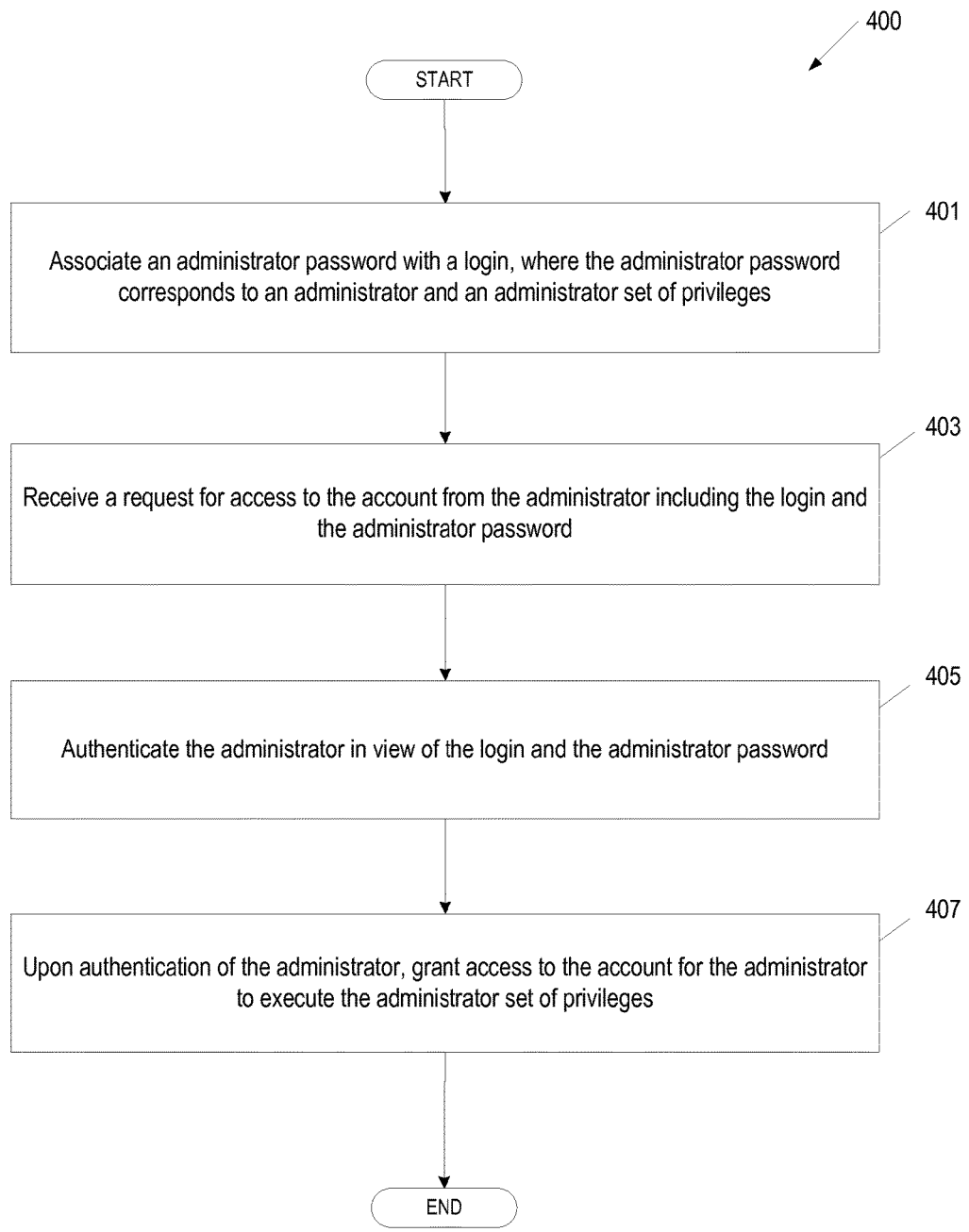
FIG. 4 illustrates a flow diagram of an embodiment of a method of establishing an administrator for single login multiplexing according to one embodiment.

FIG. 4 is a flow diagram of an embodiment of a method 400 of establishing an administrator for single login multiplexing. The method 400 is performed by processing logic that may comprise hardware (circuitry, dedicated logic, etc.), software (such as is run on a general purpose computer system or a dedicated machine), or a combination of both. In one embodiment, the method 400 is performed by the login system 210 of FIG. 2.

At block 401, processing logic associates an administrator password for an administrator with a login and an administrator set of privileges with the administrator password. For example, the administrator password, the set of administrator privileges, and the association between them can be stored in a data store. In an example, the administrator set of privileges is different from the first set of privileges.

Further to the example above, the organization may desire to have a member of the organization perform certain administrative actions, such as adding or deleting users or modifying the privileges of users, on the organization's account for the content sharing service. Thus, the organization can submit a request to associate an administrator password and a set of administrator privileges with the organization's login for an administrator.

At block 403, processing logic receives a request for access to the account from the administrator including the login and the administrator password. At block 405, processing logic authenticates the administrator in view of the login and the administrator password. At block 407, upon authentication of the administrator, processing logic grants access to the account for the administrator to execute the administrator set of privileges.

Further to the example above, the organization would like for the administrator to terminate a user on the organization's account on the content sharing service. So, the administrator requests access to the organization's account with the content sharing service using the login and the administrator password. Upon authentication of the administrator, the administrator is now able to terminate a user on the organization's account on the content sharing service.

Figure 5:
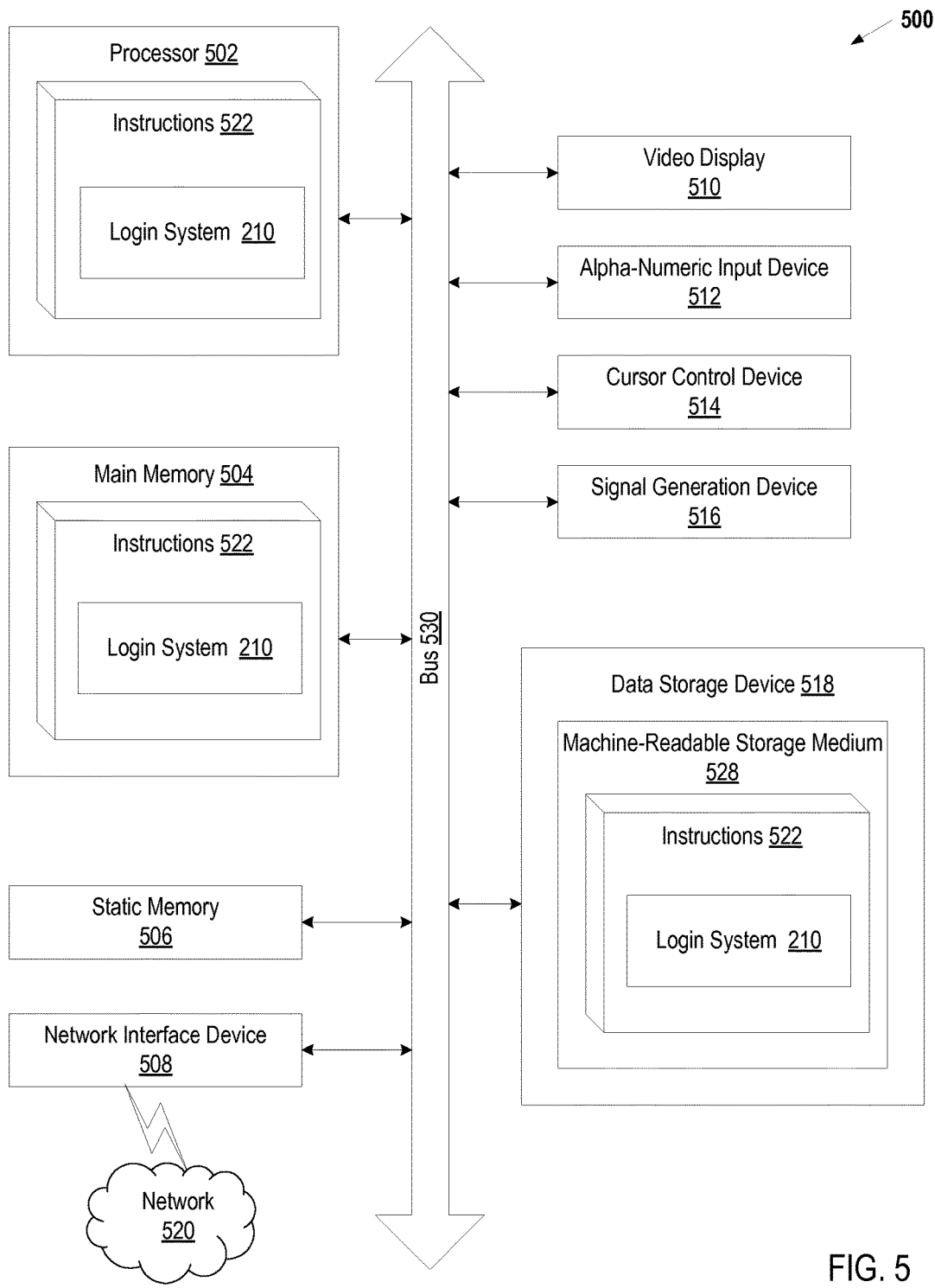
FIG. 5 illustrates a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for a password system (e.g., login system 210 of FIG. 2). While the computer-readable storage medium 528 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "determining", "configuring", "searching", "sending," "receiving," "requesting," "providing," "generating," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    maintaining, by a processing device, authorization data in a data store, the authorization data comprising an association of a plurality of passwords of a plurality of users with a username shared by the plurality of users for an account of an application in a data store, wherein each of the plurality of passwords has a corresponding user of the plurality of users and a corresponding set of privileges;
    receiving, by the processing device, a request for access to the account from a first user device of a first user, the request comprising the shared username and a first password of the plurality of passwords, the first password corresponding to the first user;
    authenticating, by the processing device, the first user in view of a comparison of the shared username and the first password with the authorization data;
    upon authentication of the first user, granting, by the processing device, access to the account for the first user device of the first user to execute a corresponding first set of privileges;
    receiving, by the processing device, a request for access to the account from a second user device of a second user, the request comprising the shared username and a second password of the plurality of passwords, the second password corresponding to the second user;
    authenticating, by the processing device, the second user in view of a comparison of the shared username and the second password with the authorization data; and
    upon authentication of the second user, granting, by the processing device, access to the account for the second user device of the second user to execute a corresponding second set of privileges.

2. The method of claim 1, further comprising:
    associating an administrator password with the shared username, wherein the administrator password corresponds to an administrator and an administrator set of privileges, wherein the administrator set of privileges is different from the first set of privileges and comprises the privilege of associating and dissociating each of the plurality of passwords with the shared username;
    receiving a request for access to the account from the administrator comprising the shared username and the administrator password;
    authenticating the administrator in view of the shared username and the administrator password; and
    upon authentication of the administrator, granting access to the account for the administrator to execute the administrator set of privileges.

3. The method of claim 2, further comprising providing an administrator user interface that displays each of the plurality of passwords, and a corresponding user and a corresponding set of privileges for each of the plurality of passwords.

4. The method of claim 1 further comprising:
    receiving a message from the first user for the second user; and
    sending the message to the second user.

5. The method of claim 1 further comprising:
    providing a user interface that indicates each currently authenticated user in view of a corresponding password.

6. The method of claim 5, wherein the user interface further displays for each currently authenticated user a session length.

7. The method of claim 5, wherein the user interface further displays for each currently authenticated user a user location.

8. A system comprising:
    a memory having a data store to store authorization data comprising an association of a plurality of passwords of a plurality of users with a username shared by the plurality of users for an account of an application in a data store, wherein each of the plurality of passwords has a corresponding user of the plurality of users and a corresponding set of privileges; and
    a processing device coupled to the memory to:
        receive a request for access to the account from a first user device of a first user, the request comprising the shared username and a first password of the plurality of passwords, the first password corresponding to the first user;
        authenticate the first user in view of the shared username and the first password;
        upon authentication of the first user, grant access to the account for the first user to execute a corresponding first set of privileges;
        receive a request for access to the account from a second user device of a second user, the request comprising the shared username and a second password of the plurality of passwords, the second password corresponding to the second user;
        authenticate the second user in view of a comparison of the shared username and the second password with the authorization data; and
        upon authentication of the second user, grant access to the account for the second user to execute a corresponding second set of privileges.

9. The system of claim 8, wherein the processing device is further to:
    associate an administrator password with the shared username, wherein the administrator password corresponds to an administrator and an administrator set of privileges, wherein the administrator set of privileges is different from the first set of privileges and comprises the privilege of associating and dissociating each of the plurality of passwords with the shared username;
    receive a request for access to the account from the administrator comprising the shared username and the administrator password;

authenticate the administrator in view of the shared username and the administrator password; and upon authentication of the administrator, grant access to the account for the administrator to execute the administrator set of privileges.

10. The system of claim 9, wherein the processing device is further to provide an administrator user interface that displays each of the plurality of passwords, and a corresponding user and a corresponding set of privileges for each of the plurality of passwords.

11. The system of claim 8, wherein the processing device is further to:

receive a message from the first user for the second user; and send the message to the second user.

12. The system of claim 8, wherein the processing device is further to:

provide a user interface that indicates each currently authenticated user in view of a corresponding password.

13. The system of claim 12, wherein the user interface further displays for each currently authenticated user a session length.

14. The system of claim 12, wherein the user interface further displays for each currently authenticated user a user location.

15. A non-transitory computer-readable storage medium including instructions that, when executed by a processing device, cause the processing device to perform operations comprising:

maintaining authorization data in a data store, the authorization data comprising an association of a plurality of passwords of a plurality of users with a username shared by the plurality of users for an account of an application in a data store, wherein each of the plurality of passwords has a corresponding user of the plurality of users and a corresponding set of privileges;

receiving a request for access to the account from a first user device of a first user, the request comprising the shared username and a first password of the plurality of passwords corresponding to the first user;

authenticating the first user in view of a comparison of the shared username and the first password with the authorization data;

upon authentication of the first user, granting access to the account for the first user device of the first user to execute a corresponding first set of privileges;

receiving a request for access to the account from a second user device of a second user, the request comprising the shared username and a second password of the plurality of passwords, the second password corresponding to the second user;

authenticating the second user in view of a comparison of the shared username and the second password with the authorization data; and upon authentication of the second user, granting access to the account for the second user device of the second user to execute a corresponding second set of privileges.

16. The non-transitory computer-readable storage medium of claim 15, wherein the operations further comprise:

associating an administrator password with the shared username, wherein the administrator password corresponds to an administrator and an administrator set of privileges, wherein the administrator set of privileges is different from the first set of privileges and comprises the privilege of associating and dissociating each of the plurality of passwords with the shared username;

receiving a request for access to the account from the administrator comprising the shared username and the administrator password;

authenticating the administrator in view of the shared username and the administrator password; and upon authentication of the administrator, granting access to the account for the administrator to execute the administrator set of privileges.

17. The non-transitory computer-readable storage medium of claim 16, wherein the operations further comprise providing an administrator user interface that displays each of the plurality of passwords, and a corresponding user and a corresponding set of privileges for each of the plurality of passwords.

18. The non-transitory computer-readable storage medium of claim 15, wherein the operations further comprise receiving a message from the first user for the second user; and sending the message to the second user.

19. The non-transitory computer-readable storage medium of claim 15, wherein the operations further comprise providing a user interface that indicates for each currently authenticated user in view of a corresponding password.

20. The non-transitory computer-readable storage medium of claim 19, wherein the user interface further displays for each currently authenticated user a session length.

* * * * *